Jan. 14, 1936.                R. E. OLSON                2,027,929
                          HEAT EXCHANGE SYSTEM
                          Filed March 20, 1934
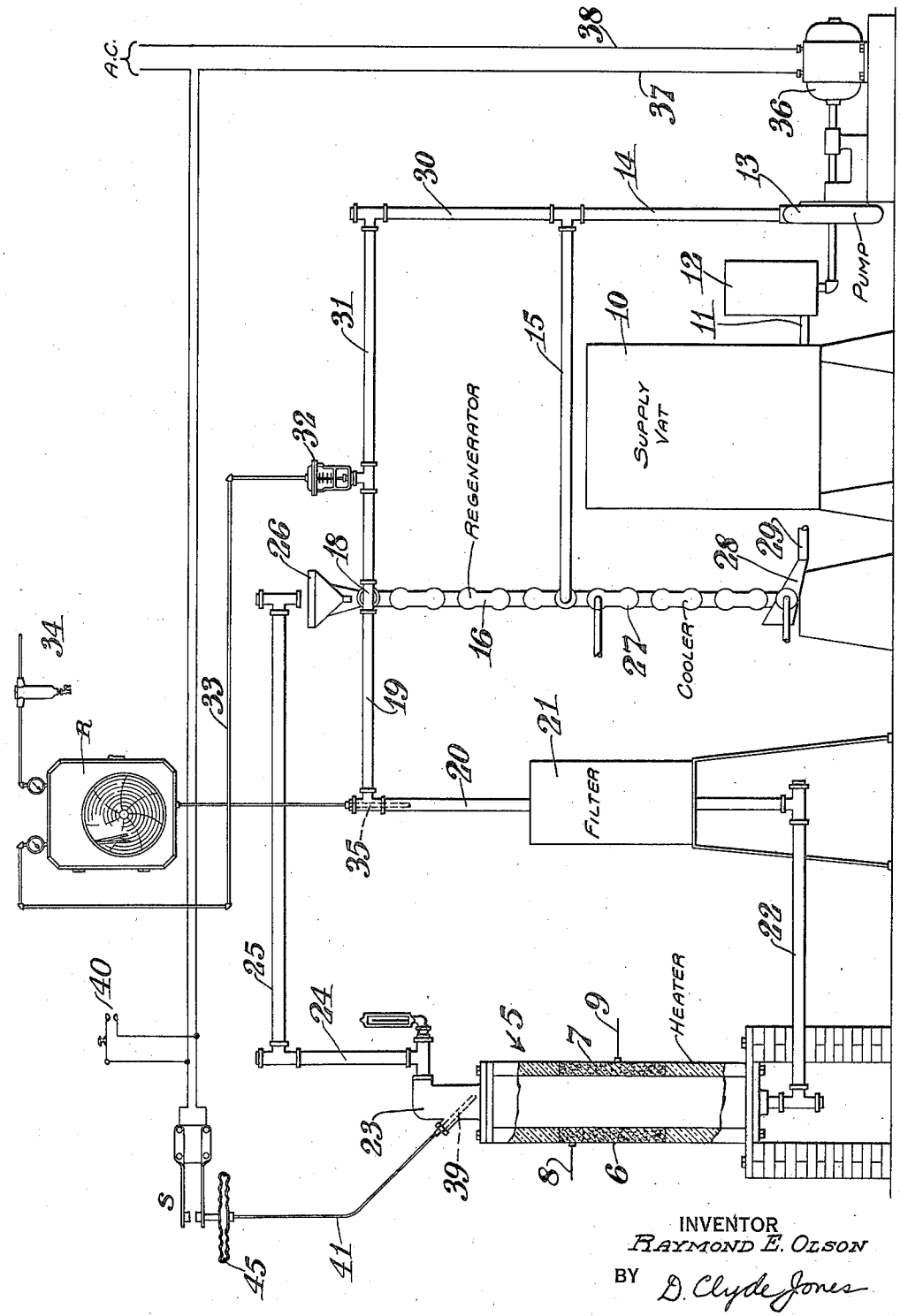
INVENTOR
RAYMOND E. OLSON
BY D. Clyde Jones
ATTORNEY Patented Jan. 14, 1936

2,027,929

UNITED STATES PATENT OFFICE 2,027,929

HEAT EXCHANGE SYSTEM

Raymond E. Olson, Rochester, N. Y., assignor to Taylor Instrument Companies, Rochester, N. Y., a corporation of New York Application March 20, 1934, Serial No. 716,507

9 Claims. (Cl. 257—2)

This invention relates to a heat exchange system and more particularly to a method of and to apparatus for controlling the temperature of a liquid heated in a heat exchange system.

In one type of heat exchange system, it has been proposed to heat a liquid therein to a predetermined temperature in spite of changes in the rate of flow of the liquid through the system and in spite of changes in the temperature of the incoming liquid to be heated, by varying the amount of heat introduced into the system in response to variations in the temperature of the heated liquid.

It has also been proposed to heat a liquid in a heat exchange system to a predetermined temperature by supplying a fixed amount of heat to the liquid and varying the rate of flow of the liquid through the system in accordance with the temperature of the heated liquid, by regulating the speed of the pump which forces the liquid through the system.

In accordance with the present invention, it is proposed in a heat exchange system of the constant heat input type, to supply the liquid to the heater at a substantially uniform rate of flow and at a substantially uniform temperature. More specifically, the invention relates to a heat exchange system having a regenerator therein for partially heating the liquid supplied to the heater, in which system the liquid passing through the regenerator is mixed with unheated liquid so that the resulting liquid is supplied to the heater at a substantially constant uniform temperature.

These and other features of the invention will appear from the detailed description and claims when taken with the drawing which diagrammatically represents the invention incorporated in a pasteurizing system.

Referring especially to the drawing, 5 designates a rectangular milk heater or pasteurizer of the type having two exposed carbon plates or other electrodes 6 and 7 mounted in the walls thereof. These electrodes are electrically insulated from each other but are respectively connected by conductors 8 and 9 to a source of uniform electric current (not shown). The construction of this pasteurizer is well-known in the art and it is merely necessary to mention that it heats the milk by reason of the inherent electrical resistance of the milk to the passage of current between electrodes 6 and 7. Thus in the normal operation of this pasteurizer a fixed predetermined amount of heat is supplied to the milk passing through the heater.

In this system, milk from the supply tank 10 flows through pipe 11 to the surge tank 12 and thence to the pump 13. From the pump, milk passes through pipe 14 and the branch pipe 15 to the upper or regenerative part 16 of a combined regenerator and cooler, from which the milk emerges through connection T 18 and passes through the pipes 19 and 20 to the filter 21. From the filter, the milk flows through the pipe 22 into the lower end of the heater 5, where it is heated by the current passing between the electrodes or plates 6 and 7. After being thus heated, the milk flows through the outlet 23, through pipe 24 and the relatively long length of pipe 25 whence it discharges into the elongated trough or funnel 26. From this funnel the milk flows over the outside of the coils of the regenerator 16 and over the outside of the coils of the cooler 27 (through which a circulating cooling medium such as cold brine is circulated). After flowing over the coils of the cooler, the milk passes from the trough 28 through a pipe 29 to a storage tank or to a suitable bottling machine.

It will be noted that the pipe 14 also is connected to a branch conduit including the pipe sections 30 and 31, section 31 being connected directly to the connection T 18. Thus this branch conduit is connected directly to the pipe section 19 so that milk passing therethrough does not come into contact with the heated coils of the regenerator 16. The pipe section 31 has a valve 32 connected therein which valve is actuated by pressure fluid, such as compressed air, applied through the conduit 33 from the source pipe 34 under the control of the combined recording and regulating device R which may be similar to that disclosed in the applicant's copending application, Serial No. 706,801 filed January 16, 1934. The device R may also be of any well-known construction and includes a thermosensitive element or bulb 35 extending into the pipe section 20 so that in response to changes in temperature in the milk about the bulb 35, the regulating device R operates to control the adjustment of the valve 32.

The pump 13 is driven by an electric motor 36, the operating current for which is supplied from a suitable source over a circuit including the conductors 37 and 38, under the control of a thermostatically operated switch S or the manually operated switch 40. The contact springs of the thermostatically operated switch S are actuated by a liquid or vapor-filled tube system which includes a thermosensitive element or bulb 39 in the outlet 23 of the heater, and a capillary tube 41 communicating with said bulb and with a diaphragm 42. By this arrangement, when the temperature of milk about the element 39 at the outlet of the heater, drops below a predetermined value, the thermostatically operated switch S opens the circuit to the motor 36 and thereby stops the operation of the pump until the temperature of the milk in the mentioned outlet is above the predetermined value.

In the operation of the system, the manual switch 40 is held closed by the attendant until the milk reaches the predetermined temperature at which the thermostatically operated switch S is set and after reading this temperature, the manually operated switch 40 is opened. With either the manual switch 40 or the thermostatically controlled switch S closed, the circuit including conductors 37 and 38 is completed, so that the motor 36 operates the pump 13 to pump milk from the supply vat 10 through the pipes 14 and 15, thence through the coils of the regenerator 16. From the regenerator the milk flows through pipes 19 and 20, filter 21, pipe 22 to the heater. From the heater the milk flows through the outlet 23, pipes 24 and 25 and into the funnel 26, from which it passes over the outside of the coils 16 of the regenerator and after giving up a large amount of its heat, continues to flow over the outside of the cooling coils 27 to trough 28 and through pipe 29 to a suitable storage vat or bottling device. It should be mentioned at this point that when the system is being started into operation, the valve 32 remains closed so that all of the milk passes through the regenerator 16.

In the present arrangement there is a fixed heat input into the heater and the pump 13 causes the milk to flow at a uniform rate through this heater. However, it is proposed to maintain the milk discharged from the heater at a predetermined temperature by keeping the temperature of the milk introduced into the heater at a substantially uniform temperature. This is accomplished by causing nearly all of the incoming milk to flow through the regenerator 16, but when the temperature of the milk introduced into the heater, as indicated by the bulb 35, is too high a portion of the cold milk from the milk supply vat 10 is by-passed about the regenerator, so that some of the cold milk is mixed with the milk that has been parially heated in the regenerator. Thus as long as the milk passing through the pipes 19 and 20, is at a desired value such as 130° F, the valve 32 is held closed. However, when the milk passing through these pipes exceeds the temperature of 130° F., the regulating device R opens the valve 32 so that the necessary amount of cold milk to cool the milk at bulb 35 to the uniform temperature, flows through the branch conduit 31 directly to the pipe sections 19 and 20.

While the invention has been described in connection with the pasteurizing of milk, it will be understood that it is equally applicable to the heating or cooling of other liquids to a predetermined temperature.

What I claim is:

1. The method of heating a liquid to a predetermined temperature in a system including a heater which comprises mixing, externally of said heater, a portion of said liquid in a partially heated state with a portion of said liquid in a cool state to provide a resulting mixture of a given uniform temperature less than the predetermined temperature, and heating the resulting mixture in said heater to the predetermined temperature.

2. The method of heating a liquid to a predetermined temperature which comprises mixing, externally of a heated region a portion of said liquid in a partially heated state with a portion of said liquid in a cool state to provide a resulting mixture of a given uniform temperature, and causing said mixture to flow at a uniform rate through a region supplied with a substantially uniform heat input, to heat the mixture to the predetermined temperature.

3. The method of heating a liquid to a predetermined temperature which comprises causing the liquid to flow in a divided path joining a common path leading to a heated region and thence through said region to raise the temperature of said liquid therein to the predetermined value while subjecting the liquid in one branch of said path to heat at a lower value than said predetermined value and while varying the amount of liquid flowing through said other path in accordance with the temperature of the liquid flowing into said region.

4. The method of heating a liquid to a predetermined temperature which comprises causing the liquid to flow at a uniform rate in a divided path joining a common path leading to a region having a uniform heat input and thence through said region to heat said liquid to the predetermined temperature, while subjecting the liquid in one branch of said path to heat and while varying the amount of liquid flowing through said other path in accordance with the temperature of the liquid flowing into said region.

5. In a heat exchange system, a heater for heating a liquid to a predetermined temperature, a regenerator, means for causing said liquid to flow through said generator and said heater and then to flow in heat exchange relation at said regenerator with said incoming liquid, and means for supplying a portion of said liquid to said heater independently of said regenerator in amounts to maintain the temperature of the liquid flowing into said heater at approximately a given value.

6. In a heat exchange system, a uniform heat input heater for heating a liquid to a predetermined temperature, a regenerator, means for causing said liquid to flow through said regenerator and said heater and then to flow at a uniform rate in heat exchange relation with said incoming liquid at said regenerator, and means for supplying a portion of said liquid to said heater independently of said regenerator in amounts just sufficient to maintain the temperature of the liquid flowing into said heater at approximately a given value.

7. In a heat exchange system, a heater for heating a liquid to a predetermined temperature, a source of said liquid, means including branched pipes for supplying liquid from said source to said heater, a regenerator connected in one branch pipe, means for causing the liquid discharged from said heater to pass in heat exchange relation with the incoming liquid at said regenerator, and means for controlling the flow of said liquid through said other branch pipe so that a mixture of regenerator-heated and unheated liquid at a given uniform temperature is supplied to said heater.

8. In a heat exchange system, a uniform heat input heater for heating a liquid to a predetermined temperature, a source of said liquid, means including branched pipes for supplying liquid from said source at a uniform rate to said heater, a regenerator connected in one branch pipe, means for causing the liquid discharged from said heater to pass in heat exchange relation with the incoming liquid at said regenerator, and means for controlling the flow of said liquid through said other branch pipe so that a mixture of regenerator-heated and unheated liquid at a given uniform temperature is supplied to said heater.

9. In a heat exchange system, a heater for heating a liquid to a predetermined temperature, a source of said liquid, means including a divided conduit for supplying liquid from said source to said heater, means for supplying heat from the liquid previously heated, to the liquid passing through one branch of the conduit, a regulating valve in said other branch of the conduit, and means including a thermosensitive element responsive to the temperature of the liquid introduced into said heater for adjusting said regulating valve whereby liquid at a given temperature is introduced into said heater.

RAYMOND E. OLSON.